United States Patent Office 3,395,342
Patented July 30, 1968

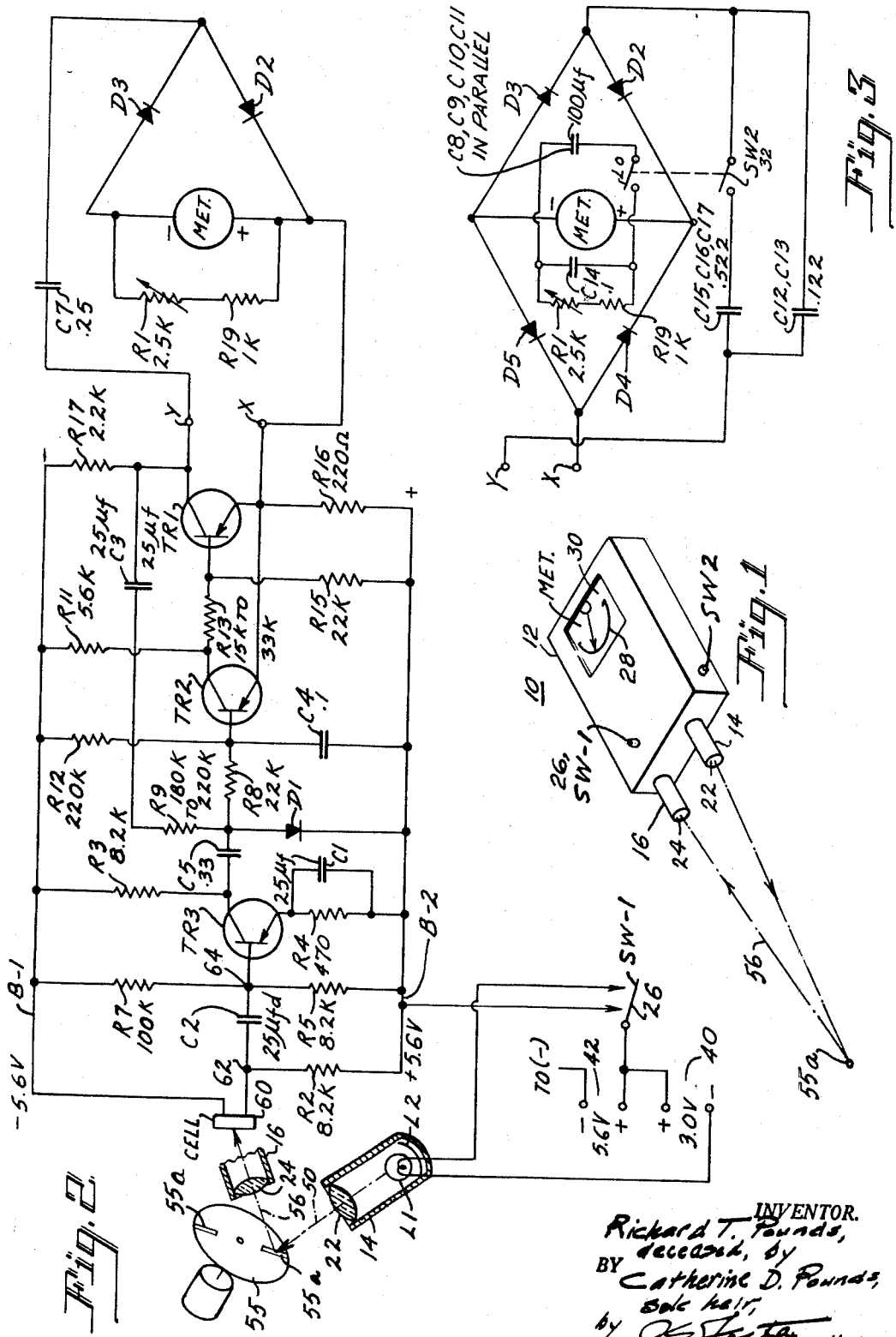

3,395,342
TACHOMETER EMPLOYING A MOTION SENSING PHOTOCELL CONNECTED AS ONE ARM OF A BRIDGE CIRCUIT
Richard T. Pounds, deceased, late of Bristol, Ind., by Catherine D. Pounds, sole heir and legal representative, P.O. Box 385, Arlington, Va. 22210
Continuation of application Ser. No. 469,021, June 8, 1965, which is a continuation of application Ser. No. 90,578, Feb. 20, 1961. This application Oct. 31, 1967, Ser. No. 687,403
8 Claims. (Cl. 324—70)

This invention relates to tachometers, and particularly to a photoelectric speed measuring device for measuring the speed of a rotating or reciprocating body. This application is a continuation of application Ser. No. 469,021, filed June 8, 1965, now abandoned, which was in turn a continuation of application Ser. No. 90,578, filed Feb. 20, 1961, also now abandoned.

In many phases of industrial and commercial activities it is frequently necessary to measure the rotational speed of machinery. This may be accomplished in a number of ways, depending upon the nature of the device. If the rotating member is supported by a shaft, the end of which is accessible, speed measurement is sometimes accomplished by means of a revolution counter, the operator observing the number of revolutions occurring in a given interval of time and computing the rate per minute. Hand held tachometers of several types are also available for this purpose, permitting direct reading of rotational speed without the necessity of making calculations. For obvious reasons all devices of the class described suffer the disadvantage that physical contact must be made between the measuring device and the center of the rotating object whose speed is to be measured. This is a distinct disadvantage, as the construction of many machines and parts thereof is such that contact with the rotating center either is not possible, or requires that safety guards or other machine parts be removed. This frequently creates a condition hazardous to the operator or observer.

Rotational speed may also be measured without making physical contact by using a stroboscopic device, which may take the form of a light source designed to be turned OFF and ON at a controllable rate of speed, the operator adjusting the rate so as to cause the rotating device to appear stationary. Such devices are usually provided with a calibrated dial, indicating the rate at which synchronization occurs. Other forms of the stroboscope devices are available, all of which utilize the principle of synchronizing the motion of one object with that of another and determining the speed when relative motion is zero, on the basis of prior calibration.

Stroboscopic speed measurements suffer a severe limitation in that they cannot be used at low speeds since their principle of operation requires that rapidity of motion be greater than the response time of the human eye. Another disadvantage is that the device being measured must be operating at a constant speed. Still another disadvantage is that because of harmonic relationship, synchronization may appear to exist at any one of several viewing rates and, therefore, grossly inaccurate measurements may result unless the operator is skilled in use of the stroboscope.

Because of the limitations and inconvenience of using commonly available speed measuring devices, hazardous conditions are sometimes created needlessly in many industrial, commercial and farming operations, since measurements which should be made to determine whether a particular machine is operating within its prescribed safe limit are neglected. One example of this situation may be found wherever abrasive wheels are used in grinding operations. If such wheels are operated at a rotational speed greater than that for which they are designed, centrifugal forces may cause the wheel to break apart, the pieces of which will be projected at high velocity, in a line tangent to the wheel's axis of rotation. The destructive forces of pieces from a shattered abrasive wheel, even a moderate sized one, is sufficient to pierce steel guards, and is a common cause of fatalities in industrial accidents.

Moreover, wheels operated at improper speeds do not properly accomplish the grinding operation for which they were designed, and, therefore, are not only hazardous but are economically wasteful.

Not only is accurate speed measurement important in a wide variety of industrial, commercial and farming operations, but the range of speeds varies considerably. For instance, a tumbling barrel may be operated at speeds ranging from 10–100 r.p.m., milling cutters may run at speeds ranging from about 100 to several hundred r.p.m. Large grinding wheels may be operated at speeds as low as a few hundred r.p.m., while smaller ones may be designed to run at several thousand r.p.m. A free running disc grinder may turn at say 3000 r.p.m., and yet its speed may drop to 1500 r.p.m. when properly loaded. Tachometers previously available do not permit measurements to be taken over the wide range of speeds commonly encountered and, therefore, several instruments were previously needed if all ranges were to be accommodated.

In order to overcome the limitations of other types of tachometers and speed measuring devices, I have invented a new and novel tachometer one object of which is to provide the user with a readily portable instrument by means of which rotational speeds may be quickly, accurately and safely measured.

Another object of my invention is to provide means of measuring the speed of rotating devices, without the necessity of making physical contact therewith.

Another object of my invention is to provide means whereby the user may easily determine if the instrument is correctly calibrated.

Still another object of my invention is to provide means of easily measuring the speed of a body's rotation on a variable axis, as for instance, the tub of a centrifugal water extractor or laundry dryer.

A further object of my invention is to provide means of measuring speed of rotating objects without adding a frictional load to the device being tested.

A still further object of my invention is to provide means whereby an instrument with a single calibration range may be used to measure either very low speeds or very high speeds with equal accuracy.

Still another object of my invention is to provide means of ascertaining the variations in speed of a rotating body.

Another object of my invention is to provide means of measuring the repetitive rate of an oscillating or reciprocating body with the same instrument ordinarily used for measuring rotating speeds.

Another object of my invention is to provide means whereby the speed of an object moving in a straight line may be measured in terms of units of distance per unit of time.

Still another object of my invention is to provide means of determining the repetitive rate of variable intensity light sources, or the frequency of the exciting source of energy used for powering light sources whose intensity varies periodically.

In order to accomplish these and other objectives, I have devised a system of speed measurement whereby a beam of light is caused to be directed at any convenient point on a revolving body. Markers previously attached to the body are of a contrasting color (or of a different shade of the same color), are successively illuminated by the beam as the object rotates, reflecting a part of the light back towards the instrument where it is sensed by a suitable photo-sensitive device. In turn, the photo-sensitive element causes an electrical impulse to be developed each time a marker reflects light. By using a suitable amplifying circuit and feeding its electrical output into the input of a frequency measuring and indicating network, a workable tachometer may be produced. Since no physical contact is needed in order to take speed measurements, the device is inherently safer to use than ordinary hand-held tachometers. Also, by proper selection of components, determining the frequency range through which the tachometer is to operate, a multiple range of r.p.m. scales becomes immediately available to the operator, all of which have *exactly* equal ratios. This is more apparent when one considers the device in this fashion: If the device is calibrated to cover a basic range of 0–12,000 r.p.m., this will correspond to a frequency range of 0–200 cycles per second.

Mechanically driven, hand-held tachometers used commercially, are provided with multiple range scales, alleviating the latter disadvantage, but is not an entirely satisfactory solution, since it is difficult to maintain an exact calibration relationship between the scales. For example, if a measurement taken on the low speed segment of the HIGH range scale of an ordinary tachometer is compared with a reading taken on the upper segment of the instrument's LOW range scale, the two are apt to be in disagreement and the operator is left in doubt as to the actual speed.

Further objects and features, embodied in the circuitry, are to provide.

(1) An indicator current proportional to rate of rotation;

(2) An indicator current independent of size of signal marker;

(3) A computer circuit to respond only to predominant signal pulses, and to automatically adjust response to the average level of predominant pulses;

(4) Suitable means whereby the time available for recharging the computer capacitor will always be sufficiently great to permit the charge to reach at least 99.9% of the supply voltage, regardless of the magnitude or duration of the exciting pulses;

(5) Suitable means of stabilizing the computer circuit so as to insure reliability through a wide range of environmental temperatures; and (6) Suitable means of insuring that instrument will respond only to signals whose magnitude is sufficiently great so as to guarantee reliable speed readings.

The arrangement of the elements of the tachometer, in accordance with this invention, and their method of operation, may be understood upon reference to the accompanying drawings, in which:

FIGURE 1 is a perspective view of the portable tachometer of this invention, showing the two lens barrels for the incident and the reflected light beams, and the simple push button to initiate the operation;

FIGURE 2 is a circuit diagram of the tachometer circuitry; and

FIGURE 3 is a diagram of the metering circuit for a dual range tachometer of the kind shown in FIGURE 2.

As shown in FIGURE 1, the portable tachometer 10, as seen assembled, comprises a case 12, of box shape, having two barrels or cylinders 14 and 16 projecting from the front end 18 to accommodate separate lenses 22 and 24. A push button switch 26 (SW–1), initiates operation of the tachometer. The scale 28 of the indicating instrument 30 is exposed at the top of the case 12. For a dual range instrument a switch 32 is provided to select the metering range desired.

FIGURE 2 shows the circuit diagram. Energy for operation is derived from two batteries 40 and 42. The push button switch SW–1 corresponds to switch 26 of FIGURE 1, and connects both batteries 40 and 42 in circuit. Battery 40 energizes lamp L–1, which, with a suitable reflector L–2, in barrel 14, projects an incident light beam 50 at the movable object 55 whose speed is to be measured, and the reflected light beam 56 is collected by lens 24 in barrel 16 and focused on photocell 60.

The incident light beam 50 should be directed at a surface of the movable object 55 that provides a discontinuity in the reflection, since the system is designed to operate on separate light pulses. Otherwise, suitable markers or strips of material 55–a may be disposed on the movable object 55, which is shown as a disc 55, in FIGURE 2, to which the markers 55–a are applied as narrow radial strips of material to provide a contrast in reflectivity relative to the material of the disc 55. This change in reflectivity provides the differential activation of the light cell 60 to initiate generation of an electrical pulse.

The markers may be similarly applied to an object moving in a linear path, or reciprocated, in a cyclical manner.

Assuming, now, that the reflected beam 56 is broken into pulses or is sufficiently undulating to affect the system, the resistance of cell 60 will change from high resistance to a low resistance value.

The operating switch 26 or SW–1, which connects lamp L–1 to battery 40, also connects battery 42 to the positive terminal of bus B–2, with bus B–1 directly connected to the negative terminal of battery 42, so that busses B–1 and B–2 serve as negative and positive potentials, respectively of battery 42.

When switch 26, SW–1, is closed the circuits are activated. No reading should show on the meter unless a signal is received.

Condenser C–7 prevents instantaneous current to the meter.

In addition, voltage-dividers R–11, R–13 and R–15 put forward bias on base of TR–1, and TR–1 is put into saturation and closes immediately, to put a shunt across the terminals X and Y, so no current will enter the meter 30.

TR–2 should stay open. Proper positive bias is put on the base of TR–2 by voltage-divider R–12, R–8 and back resistance of D–1.

TR–3 should stay open. Proper positive bias is put on the base of TR–3 by the two bridge arms R–7 and R–5, as a voltage divider.

No signals are being transmitted. The meter reads zero.

Speed measurement is now desired. The instrument is aimed at the rotating device 55. The reflected light beam hits the cell 60 for the duration of the interval that the light beam is on the reflecting marker 55–a. The cell resistance drops and the bridge is unbalanced. Capacitor C–2 charges negatively for said time interval of reflection, and puts a negative pulse on base of TR–3, sufficient to overcome the positive bias on base TR–3.

TR–3 goes to saturation, and closes for the duration of said time interval pulse. TR–3 closed, puts positive pulse from collector onto C–5, which holds TR–2 open for duration of that positive pulse. When TR–3 goes open, due to C–2 discharge, TR–3 collector goes negative. Therefore C–5 goes negative, and puts immediate negative on TR–2.

While TR–3 was closed, D–1 drained positive charges from C–3 and C–4. Therefore, the negative pulse from C–5 was effective immediately on base of TR–2.

TR–2 thereupon saturates and closes. That reduces forward bias on TR–1, whose collector goes more negative and regenerates more negative at base of TR–2 to contribute to fast TR–2 saturation.

TR–1 goes open to cut off and puts voltage pulse onto terminals Y and X. Pulse goes from X to meter 30 through D–3 and C–7 to Y.

C–3 which had collected charge while TR–1 was closed, now discharges through R–17, R–8 and R–12, to let positive reverse bias go back on base of TR–2 which goes back to cut-off. Negative is now back on base of TR–1 which saturates and recloses.

The system is now ready for the next pulse.

The meter 30 is preferably D'Arsonval movement to provide an integrating averaging of the pulses from the monostable multivibrator consisting of TR–1 and TR–2.

The time constant of the multivibrator is short enough to enable TR–1 and TR–2 to go back to original conditions before condensers C–2 and C–5 will be recharged for the operating frequency or speed for which the meter is being used.

As TR–1 recloses, terminal Y goes more positive and the positive pulse goes from Y through C–7 and D–2 to terminal X, without going through the meter. Thus, the multivibrator does not cause a reading upon original closure of switch SW–1, but only upon actuation of the light cell.

To provide temperature compensation, the diode D–1 is employed as part of a voltage divider with R–8 and R–12. As the ambient temperature increases, the resistance of D–1 decreases and varies the bias on the base of TR–2. The condenser C–4 provides an A.C. by-pass circuit.

In order to provide a dual scale on the meter 70, the circuitry may be modified as shown in FIGURE 3. A selector switch 75 controls the circuitry to select the speed reading range desired. The meter reads both positive and negative-going excursions of the pulses.

The instrument may be readily calibrated with any commercial fluorescent light. Since the light intensity changes 120 times per second on regular commercial lines, the photo-cell or "eye," if pointed at such a light, will see 7200 pulses per minute. For a rotating device with one marker, that same scale reading would represent 7200 r.p.m. With two markers being looked at, that reading would represent 3600 r.p.m. By increasing the number of marks used on a moving object, a scale with a larger range may be used to measure a relative small speed.

The tachometer disclosed herein thus provides a simple portable device, for measuring speed over a large range, by suitably preparing the moving object to create the light pulses to the photocell. The use of the monostable multivibrator provides an independent pulse shaping and sizing circuit that eliminates error by making the pulses to the meter all of the same duration so the averaging process will be significant. The buffer circuit between the bridge and the monostable multivibrator permits each to function independently according to its own time constant.

The circuitry may be modified without departing from the spirit and scope of the invention as set forth and defined in the claims. The values of parameters shown represent a set with which the system operated according to the invention.

What is claimed is:
1. A speed-measuring apparatus, comprising:
   a meter having a current coil and a movable pointer and a co-operating scale calibrated to indicate speed units, and depending upon the frequency and energy content of energizing pulses supplied to the coil;
   a battery, a battery circuit having a pair of buss lines to be energized from said battery as positive and negative buss lines, and a manually operable switch to connect the battery to said battery circuit;
   a lamp manually operable to direct an incident light beam onto a moving object, to be reflected by and from a specific selected area of said moving object as periodic reflected light pulses;
   a light cell to receive and be illuminated by such reflected periodic light pulses, and said light cell being characterized by a high resistance when not illuminated and by a low resistance when so illuminated;
   a normally balanced Wheatstone bridge arrangement with four impedance arms connected to said battery circuit and containing said cell as one arm, and having two normal balance points with a capacitor connected between said two balance points of the bridge to receive a charge when the cell is illuminated and the bridge thereby unbalanced;
   a sensing first transistor connected to and energized from said battery circuit through its emitter and collector electrodes;
   circuit means connecting the Wheatstone bridge capacitor to the base electrode of said sensing transistor, and normally biasing said sensing transistor to open condition;
   a switching second transistor connected to said battery circuit through its emitter and collector electrodes, and means normally biasing said second transistor to open condition;
   circuit means including a capacitor and a resistor serially connecting said sensing first transistor collector terminal to said switching second transistor base terminal;
   an output pulsing third transistor connected to said battery circuit through its emitter and collector terminals;
   a voltage-divider circuit connected to said battery circuit to provide a potential bias point connected to the base terminal of said output third transistor to impress forward bias on the emitter base circuit of said output third transistor to normally bias said output third transistor to closed condition;
   means connecting said switching second transistor to said voltage-divider circuit to shift the operative potential impressed onto the base terminal of said output third transistor to establish backward bias on the emitter-base circuit of said output third transistor upon operation of said switching second transistor by said sensing first transistor;
   a first electrical load circuit connected to and extending from the emitter terminal of said output third transistor through the operating coil of said meter, and thence through a forward oriented first diode and a capacitor to the collector electrode of said output third transistor, to transmit a pulse through the meter coil when said third pulsing transistor is opened;
   and a second diode connected to bridge the meter and said first diode, and oriented reversely to said first diode, to provide a discharge path for the capacitor when said output third transistor is closed;
   said second transistor and said third transistor serving and functioning as a monostable vibrator to cause said pulses to the meter coil to be substantially uniform in duration and energy content.
2. A speed-measuring apparatus, as in claim 1, in which the junction between said capacitor and said resistor in the coupling circuit between the sensing first transistor and the switching second transistor is coupled to one side of the battery circuit through a reverse bias diode, and is coupled to the collector terminal of the output third transistor through a feedback circuit including a resistor and a capacitor.
3. A speed measuring apparatus for measuring the speed of a moving body, by measuring the frequency of light pulses reflected from a selected region of the surface of said moving body as a consequence of impingement of an incident light beam associated with said measuring apparatus and directed at said moving body to strike said selected region, said speedmeasuring apparatus comprising:
   a voltage supply source;
   a pair of buss lines to be energized from said source as positive and negative buss lines;
   a lamp to serve as a source of light beam to be directed at the moving body that is to be measured for speed;
   a thumb switch to be operated by an operator handling said apparatus, and serving when operated, to connect said source to said lamp and to said buss lines;
   an electrical four-arm bridge of two circuits with two impedance elements serially joined in each circuit to provide an intermediate juncture and both circuits being connected in parallel between said two buss lines and characterized to be normally electrically balanced so that the two junctures in the two circuits are normally of equi-potential, said bridge containing a light-responsive element in one arm as an impedance element to be normally of high resistance when not illuminated but dropping to a low resistance value when illuminated by a light beam reflected from said selected region of said moving body, to thereby unbalance said bridge and change the equipotential relation between said two junctures, to establish a potential difference therebetween;

a sensing capacitor electrically connected to and between said normally equi-potential juncture points of said electrical bridge and serving to receive a charge from said potential difference upon unbalance of said bridge resulting from illumination of said light-responsive element by such light beam reflected from said moving body;

a buffer transistor having emitter and collector electrodes respectively connected through resistors to the positive and negative buss lines, and having a base electrode;

means connecting said base electrode of said buffer transistor to one of said intermediate junctures to thereby normally bias said buffer transistor to an open condition when said bridge is balanced and to bias said buffer transistor to a closed condition when said bridge is unbalanced;

a mono-stable multivibrator trigger circuit including an input switching transistor and a controlled output pulsing transistor, each having an emitter and a collector terminal;

means connected to said buffer transistor for impressing input pulses onto said input transistor of said mono-stable multivibrator to initiate operation of said mono-stable multivibrator once each time said bridge becomes unbalanced;

and a meter circuit connected across and between the emitter and the collector terminals of said output pulsing transistor to receive and average pulses from said output pulsing transistor and to indicate the frequency of said pulses.

4. A speed measuring apparatus, as in claim 3, in which
said meter circuit consists of a meter coil circuit electrically connected across and between said emitter and collector terminals of said output pulsing transistor;
and said meter coil circuit includes an indicating meter coil, a forward biased diode and a capacitor, all in serial connection, for transmitting an energy pulse in a forward direction from said output transistor through the meter in such forward biassed direction, and said meter coil circuit also includes a reverse biassed diode connected to electrically bridge the meter coil and the forward biassed diode, said reverse biassed diode serving to by-pass around said meter coil and forward-biassed diode any energy pulse of opposite polarity from said output pulsing transistor.

5. A speed measuring apparatus, as in claim 4, in which
said monostable multivibrator includes:
a voltage-divider circuit connected to and between the two buss lines and providing an intermediate terminal point connected to the base terminal of said output pulsing transistor to establish a forward-bias potential in the emitter-base circuit of said output pulsing transistor to cause immediate saturation and closing operation of said output pulsing transistor immediately upon energization of said buss lines upon closure of said thumb switch by the operator, in order thereby to short-circuit said meter coil circuit immediately and prevent energization of said meter coil until a signal pulse is impressed on the base terminal of said output pulsing transistor.

6. A speed-measuring apparatus, as in claim 5, in which
said input switching transistor has its emitter connected to the positive buss line through an emitter resistor, and has its collector connected to the negative buss line through a collector resistor, and has its base terminal connected to a circuit normally energized to bias said switching transistor to open condition.

7. A speed-measuring apparatus, as in claim 6, in which
said means for impressing input pulses onto said input transistor of said monostable multivibrator comprises:
a coupling circuit, containing a capacitor and a resistor, connected in that sequence, from the collector terminal of said buffer transistor to the base terminal of said input switching transistor.

8. A speed-measuring apparatus, as in claim 7, including
a diode connected in reverse polarity direction between the positive buss and the junction point between the capacitor and the resistor of said coupling circuit between said buffer transistor collector and said switching transistor base;
a feed-back capacitor and resistor circuit connected from the output transistor collector to said input junction point to which said diode is connected;
and a capacitor connected between the input switching transistor base and the positive buss.

References Cited
UNITED STATES PATENTS 2,439,295    4/1948    Hammond.
3,128,384    4/1964    Nelson.

FOREIGN PATENTS 1,018,660    10/1950    Germany.

RUDOLPH V. ROLINEC, *Primary Examiner.*

M. J. LYNCH, *Assistant Examiner.*